United States Patent [19]
Murata et al.

[11] Patent Number: 5,512,946
[45] Date of Patent: Apr. 30, 1996

[54] DIGITAL VIDEO SIGNAL PROCESSING DEVICE AND TV CAMERA DEVICE ARRANGED TO USE IT

[75] Inventors: Nobuo Murata, Musashino; Yasuo Yoshimura, Hachioji, both of Japan

[73] Assignee: Hitachi Denshi Kabushiki Kaisha, Tokyo, Japan

[21] Appl. No.: 380,703

[22] Filed: Jan. 30, 1995

[30] Foreign Application Priority Data

Jan. 31, 1994 [JP] Japan .................................. 6-010046
Jan. 31, 1994 [JP] Japan .................................. 6-010047

[51] Int. Cl.⁶ .................................................. H04N 5/228
[52] U.S. Cl. .......................... 348/222; 348/240; 348/253; 348/265
[58] Field of Search ................................ 348/222, 239, 348/262, 265, 240, 571, 607, 608, 611, 612, 614, 624, 625, 627, 630, 708, 710, 711, 914, 394, 409, 415, 690, 695; 358/21 R, 35, 36, 37, 166, 167, 38, 135, 136, 160, 170, 172

[56] References Cited

U.S. PATENT DOCUMENTS 4,630,104  12/1986  Nakagaki ................................ 348/624

FOREIGN PATENT DOCUMENTS 63-114375  5/1988  Japan .
4152779  5/1992  Japan .

*Primary Examiner*—James J. Groody
*Assistant Examiner*—Sherrie Hsia
*Attorney, Agent, or Firm*—Antonelli, Terry, Stout & Kraus

[57] ABSTRACT

A digital video signal processing device for clipping a digital video signal to keep the signal at a predetermined level, includes an interpolation data signal generating unit for predicting video signal levels between adjacent sampling points for generating an interpolation data signal, clipping units for clipping the sampled video signal and the interpolation data signal at their levels, and a synthesizing unit for performing a predictive coding operation with respect to at least any one of the clipped video signal and the interpolation data signal and synthesizing these signals with each other.

7 Claims, 9 Drawing Sheets

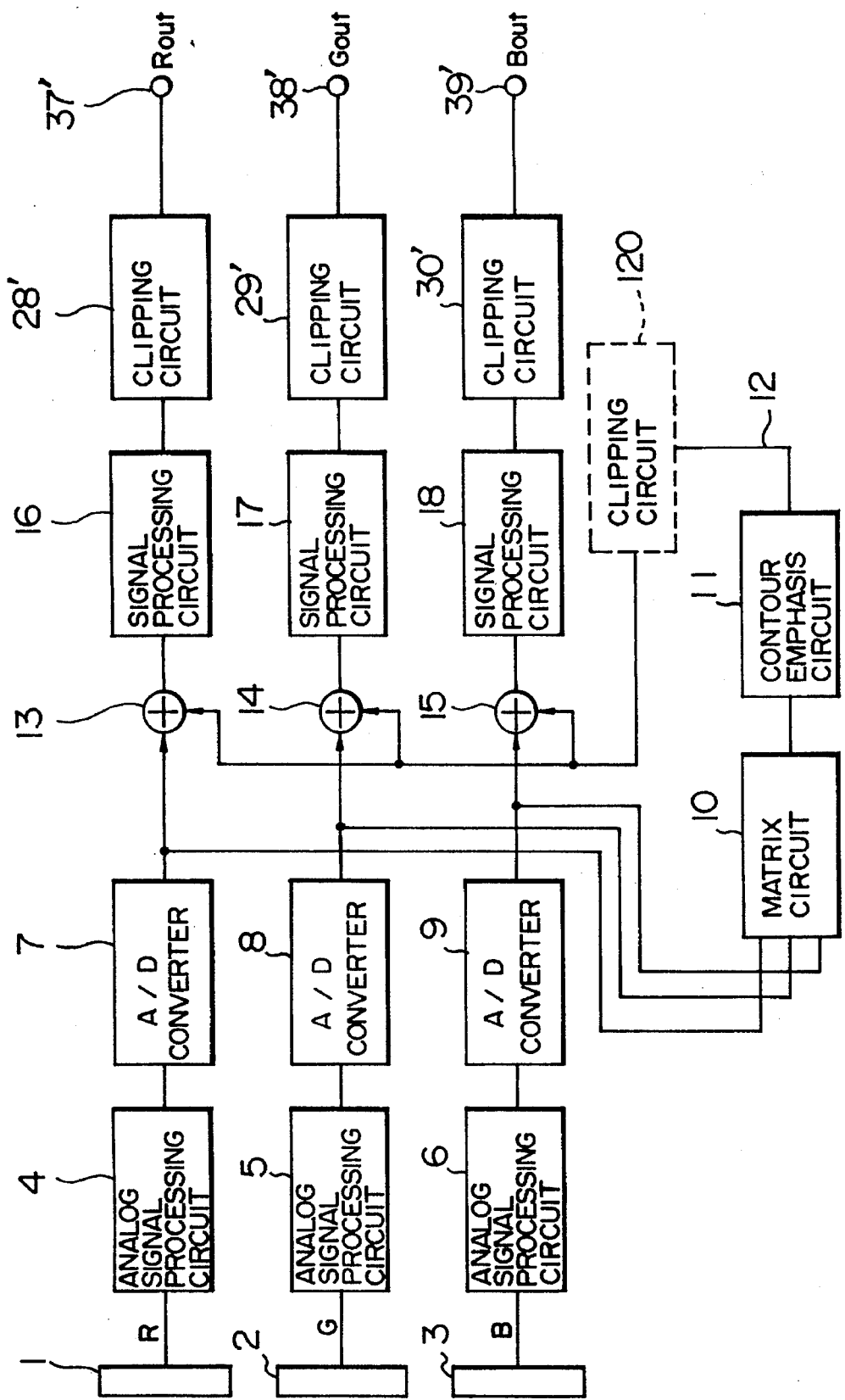

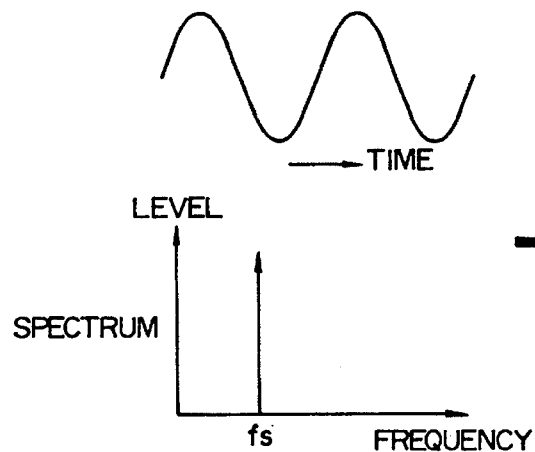
FIG. 2(A)
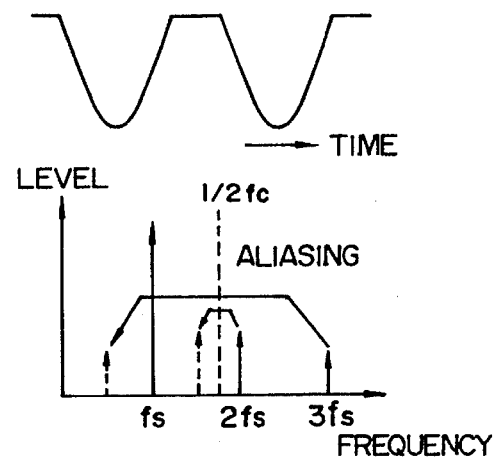
FIG. 2(B)
FIG. 3
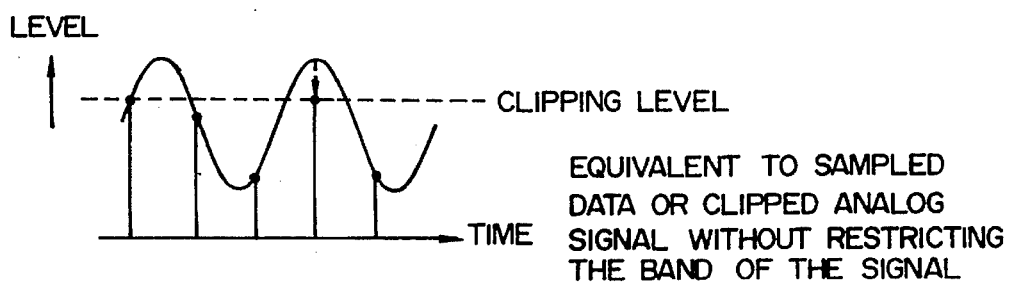

T : SAMPLING PERIOD
× : ORIGINAL DATA
○ : INTERPOLATION DATA $C_0 \sim C_{2n-1}$ : FILTER COEFFICIENT
$Z^{-1}$ : UNIT DELAY $Z^{-1}$ : UNIT DELAY $C_n \sim C_{2n-1}$ : FILTER COEFFICIENT
$Z^{-1}$ : UNIT DELAY

DIGITAL VIDEO SIGNAL PROCESSING DEVICE AND TV CAMERA DEVICE ARRANGED TO USE IT

BACKGROUND OF THE INVENTION

The present invention relates to a digital video signal processing device and more particularly to a TV camera device which is arranged to use the processing device.

In general, an imaging device such as a TV camera provides a signal output level defined in a specified range from the maximum to the minimum level. In some circumstances, however, a video signal level may go higher or lower than the specified range. For example, as mentioned below, when an image is picked up under a large amount of incident light, the video signal level goes higher. On the other hand, when it is done under a small amount of incident light, the video signal level goes lower. Or, a contour emphasis treatment is executed in the device. To overcome this drawback, the imaging device has a circuit for clipping a signal of higher or lower signal level than the specified range for suppressing the output signal level inside of the specified range. This circuit is generally referred to as a white clipping circuit or a black clipping circuit.

To digitize a video signal when processing it, the similar clipping means is required to suppress the output signal level inside of the specified range.

FIG. 1 shows a conventional arrangement of a TV camera with processing a digital video signal.

In FIG. 1, numerals 1 to 3 denote an image pickup element. Numerals 4 to 6 denote an analog signal processing circuit, which performs necessary signal treatments such as signal amplification and band restriction with respect to R, G and B video signals picked up from the image pickup elements 1 to 3. Numerals 7 to 9 denote an analog-to-digital converter, which operates to convert the output of the analog signal processing circuit 4, 5 or 6 into a digital signal. The digitized R, G and B signals outputted from the analog-to-digital converters 7–9 are sent to a matrix circuit 10 in which those signals are mixed at a predetermined ratio. Then, the mixed signal is inputted to a contour emphasis circuit 11 in which a contour emphasis signal 12 is produced from the mixed signal. A contour emphasis signal 12 higher than the predetermined signal level is clipped by a clipping circuit 120 which may be provided if necessary. Then, the clipped signal is added to each of the R, G and B signals in an adding circuit 13, 14 or 15. The R, G and B signals to which the contour emphasis signal 12 is added are processed in a signal processing circuit 16, 17 or 18. This processing is gamma correction or the like. The outputs of the signal processing circuits 16 to 18 are sent to clipping circuits 28' to 30', respectively. Those clipping circuits 28' to 30' operate to clip the signals deviated from the specified range and output the clipped signals as Rout 37', Gout 38' and Bout 39', respectively. Each signal is sent to a matrix circuit (not shown) in which the clipped signals are converted into a luminance signal Y and color difference signals I and Q.

However, the foregoing clipping brings about aliasing distortions, the cause of which will be discussed below.

Later, the description will be oriented to why this aliasing distortion takes place with reference to FIGS. 2(A), 2(B) and 3. FIGS. 2(A), 2(B) and 3 are views for explaining why the aliasing distortion is caused by digital signal processing.

In general, to convert an analog signal into a digital signal, the continuous analog signal is sampled at fixed intervals. Hence, it is to be noted that when the analog video signal is digitized, this digitizing may bring about the aliasing distortions, that is, the low frequency portions converted from higher harmonic components. The occurrence of such aliasing distortions are allowed to be prevented by restricting frequency band of an analog signal within a half or less sampling frequency before sampling. This is a well-known Nyquist condition.

As shown in FIG. 2(A), however, if a signal to be sampled (that is, an original analog signal) is a sine wave signal of such a frequency fs as satisfying the Nyquist condition before clipping, the clipping of the signal to keep the predetermined signal level results in causing the clipped signal to be mixed with higher harmonic components of an integer (n) time greater frequency than the original signal, that is, a frequency n.fs as shown in FIG. 2(B). At a time, if the clipped signal containing higher harmonic components is sampled without any band restriction, higher harmonic components having a higher frequency than a half of a sampling frequency fc are converted into low-frequency portions, which conversion brings about the aliasing distortion.

In a case that, on the other hand, the sampled signal (without any band restriction), that is, the digitized video signal which is not operated to clip with analog signal processing is clipped with digital signal processing, this is equivalent to sampling of the signal which is operated to clip with analog processing without any band restriction as described above, which thus brings about the aliasing distortion. This will be understood that the value of each sampling point is converted into a value at the clipping level as shown in FIG. 3.

Hence, if a subject analog signal the frequency band of which is restricted to a half or less of a sampling frequency is sampled, and if the sampled signal (that is, digitized signal) is clipped with digital signal processing, this brings about the aliasing distortion as mentioned above.

For a TV camera system required to do the above-mentioned clipping process, a technique for preventing occurrence of the aliasing distortion by utilizing a process of interpolation as described in JP-A-4-152779 has been known. The term "interpolation" used throughout this specification means a pseudo-interpolation wherein the calculation operation is made at each of intermediate points in a finite number between sampling points.

Later, the concrete arrangement of the technique will be briefly described with reference to the drawings.

FIG. 4 shows a block arrangement in which the technique disclosed in JP-A-4-152779 is applied to a signal level restricting circuit corresponding to the clipping circuit of FIG. 1 included in the signal processing section of a TV camera.

Below, the arrangements and the operations of the signal level restricting circuits 19' to 21' will be discussed in detail.

Data interpolating circuits 25 to 27 at a first stage will be described with reference to FIG. 5 which shows the relation between the original input data, that is, the data to be interpolated and the interpolation data.

Each of the data interpolating circuits 25 to 27 performs an interpolating process with respect to an input signal (referred to as original data signal) sampled from an original analog signal at periods T indicated by X marks of FIG. 5, for generating interpolation data indicated by circles of FIG. 5 located at a middle point of each sampling period T of the original data, for example. This process of interpolation offers an up-converted and interpolated signal having twice as high a rate as the original data signal, that is, a signal sampled at a half of the period T, which signal is composed of the original data signal and the interpolation data signal.

Ideally, an interpolation data value given in the data interpolating circuits 25 to 27 can be presumed by calculating an output provided by means that a delta function series signal passes through an ideal low-pass filter having the Nyquist frequency corresponding to a half of the sampling period T. A delta function series signal represents a discrete sampled signal. This presumption, however, requires an enormous amount of data. Actually, hence, a finite degree digital filter is used for presuming the value with doing a predicting coding process. This finite degree digital filter is arranged of delay elements 41, multipliers 42 and an adder 43 in FIG. 6.

Each of the filter coefficient values $C_0$ to $C_{2n-1}$ given to the multiplier 42 may be a designed value of a transversal type digital filter having a half of a sampling frequency fc as a cut-off frequency. As a simple example, in the case of n=2, C1 or C2=0.625 and C0 or C3=−0.125 are given as the filter coefficients.

In order to realize the process of up-converting the data signal in the data interpolating circuits 25 to 27, as shown in FIG. 6, it is just possible to synchronize the original data and the interpolation data with the sampling period, and alternately output these two data at a half of the sampling period by using a switch 44.

The outputs of the data interpolating circuits 25 to 27 are applied to the clipping circuits 28 to 30 in which the signals staying higher or lower than the specified signal level are clipped within the predetermined signal level.

The clipping of the signals in the clipping circuits 28 to 30 causes higher harmonic components to be generated. The frequency of the higher harmonic components in a range of a half of or the same as the (original) sampling frequency before up-converting is made to be in a range of a half or less time as large a value as the up-converted sampling frequency, that is, doubled sampling frequency. Hence, the higher harmonic components generated in the frequency range are not made to be the aliasing distortion while the signal is up-converted as mentioned above.

Further, these clipped signals are filtered by low-pass filters 31 to 33 for removing the higher harmonic components. The low-pass filter has a cut-off frequency set as a quarter of the up-converted sampling frequency and a half of the sampling frequency before the up-conversion.

Each output of the low-pass filters 31 to 33 is applied to the corresponding one of thinning circuits 34 to 36 in which every other piece of data is thinned out for returning the up-converted signal into a digital signal having the same sampling rate as the original data signal. Then, the digital signal is outputted to the later stage (not shown).

As set forth above, this prior art arranged to use the technique disclosed in JP-A-4-152779 operates to clip the digital signal up-converted by an interpolating process. If this clipping process brings about the higher harmonic components, these higher harmonic components fill the foregoing Nyquist condition, and no aliasing distortion takes place with respect to them. This means that this type of harmonic components the frequency of which are higher than of a data signal are allowed to be removed by a low-pass filter without missing the data signal. Thus, the digital signal processing device enables to clip a digital signal without having to bring about any aliasing distortion.

In the signal level restricting circuits 19' to 21' included in this prior art, however, digital circuits of the imaging device in the interval between the up conversion done by the data interpolating circuits 25 to 27 and the thinning-out operation done by the thinning circuits 34 to 36 are required to operate at twice as large an operating frequency as the sampling frequency before the up conversion. This may bring about a significant shortcoming in light of cost, power consumption and stability of operation.

According to another conventional technique, the contour emphasis signal 12 outputted from the contour emphasis circuit 11 is restricted in level through the effect of the circuits equivalent to the signal level restricting circuits 19' to 21'.

SUMMARY OF THE INVENTION

It is an object of the present invention to provide a digital video signal processing device which operates to reduce or prevent occurrence of an aliasing distortion in clipping a digital video signal, for enhancing image quality.

It is another object of the present invention to provide a digital video signal processing device which enables to reduce or prevent occurrence of an aliasing distortion without having to do up conversion of a digital signal and without digital processing using a higher speed (frequency) clock signal.

According to a first aspect of the invention, a digital video signal processing device includes an interpolation data generating unit for generating an interpolation data signal corresponding to an intermediate point between the adjacent sampling points of a digital video signal, a clipping unit for clipping the interpolation data signal generated and outputted by the interpolation data generating unit and the original digital video signal to an upper or a lower limit value, and a synthesizing unit for performing a predictive coding operation with respect to each clipped signal and synthesizing the coded signals together.

According to a second aspect of the invention, the synthesizing unit contained in the device according to the first aspect of the invention operates to perform a predictive coding operation with respect to any one of the clipped original video signal and the clipped intermediate data signal and synthesizing the coded signal and the in-coded signal.

According to the third aspect of the invention, a digital video signal processing device includes a unit for generating a digital contour emphasis signal from digitized R, G and B video signals and a first clipping unit for clipping the contour emphasis signal to a predetermined upper limit value or a lower limit value, an interpolation data generating unit for generating interpolation data signal corresponding to an intermediate point of a sampling period from the contour emphasis signal before it is not clipped, and a second clipping unit for clipping the interpolation data signal to the predetermined upper or lower limit value, in which the output of one clipping unit is added to the G signal for one contour emphasis signal and the output of the other clipping unit is added to the R and the B signals for the other one.

In the first aspect of the invention, the interpolation data generating unit operates to generate an interpolation data signal. The clipping units operate to clip the original digital video signal or the interpolation data signal, respectively. These operations result in bringing about higher harmonic components having a half or more of a sampling frequency, thereby causing the aliasing distortion. The phase of the aliasing distortion components generated by clipping the original digital video signal is equivalently axial-symmetric with respect to the phase of the aliasing distortion components generated by clipping the interpolation data signal in light of the sampling theorem. Considering such symmetric phase relation, the predicting coding and the synthesis of the original digital video signal and the interpolation data signal clipped by the synthesizing unit make it possible to offset the aliasing distortions in reverse phase and thereby cancel them.

In the second aspect of the invention, the synthesizing unit operates to perform a predictive coding operation with respect to any one of the original digital video signal and the interpolation data signal and synthesizing the coded signal and the in-coded signal. This operation simplifies the arrangement of the digital filtering unit for performing a predictive coding operation in comparison with the arrangement according to the first aspect of the invention.

In the third aspect of the invention, the sampling phase of one contour emphasis signal added to the G signal, which occupies about a half of luminance signal components, is axial-symmetric with respect to that of the other contour emphasis signal added to the R and B signals. Hence, the aliasing distortion caused by the first or even degree higher harmonic component of one contour emphasis signal is reverse in phase to that of the other contour emphasis signal. In a case that, hence, after those contour emphasis signals are added to the signals, the R, G and B signals are mixed with one another for producing a luminance signal, it is equivalent to the addition of the aliasing distortions in reverse phase at the similar ratios. This results in cancelling the aliasing distortions, thereby eliminating the adverse effect of the aliasing distortions on image quality at the later stages of the video signal processing device.

In addition, the signal clip also brings about even degree higher harmonic components and thereby the relevant aliasing distortions. Though those kinds of aliasing distortions are not cancelled, those higher harmonic components are so low at the level that they hardly have an adverse effect on the quality of the resulting image. Hence, those even degree higher harmonic components may be ignored.

Moreover, the luminance signals are normally mixed at a ratio of R:G:B=30:59:11, for example. In actual, therefore, the mixture is calculated as 59% − (30%+11%) =18%. That is, about 18% of aliasing distortion components are left. Such remaining distortion components are so small that they do not have a significant adverse effect on the image quality.

The above and other objects, features and advantages of the present invention will be apparent from the following description of the preferred embodiments thereof taken in conjunction with the accompanying drawings.

BRIEF DESCRIPTION OF THE DRAWINGS

FIG. 1 is a block diagram showing an arrangement of a signal processing unit of a conventional TV camera;

FIGS. 2(A) and 2(b) are graphs for explaining how an aliasing distortion takes place when a video signal is processed as a digital signal;

FIG. 3 is a graph for explaining how an aliasing distortion takes place when a video signal is processed as a digital signal;

DESCRIPTION OF THE PREFERRED EMBODIMENTS

A first embodiment of the present invention will be described below. This embodiment is arranged to improve the drawbacks of the foregoing prior art and enables to clip a reducing or preventing occurrence of aliasing distortion, without having to enhance the operating frequency on which a digital signal is processed.

Figure 7:
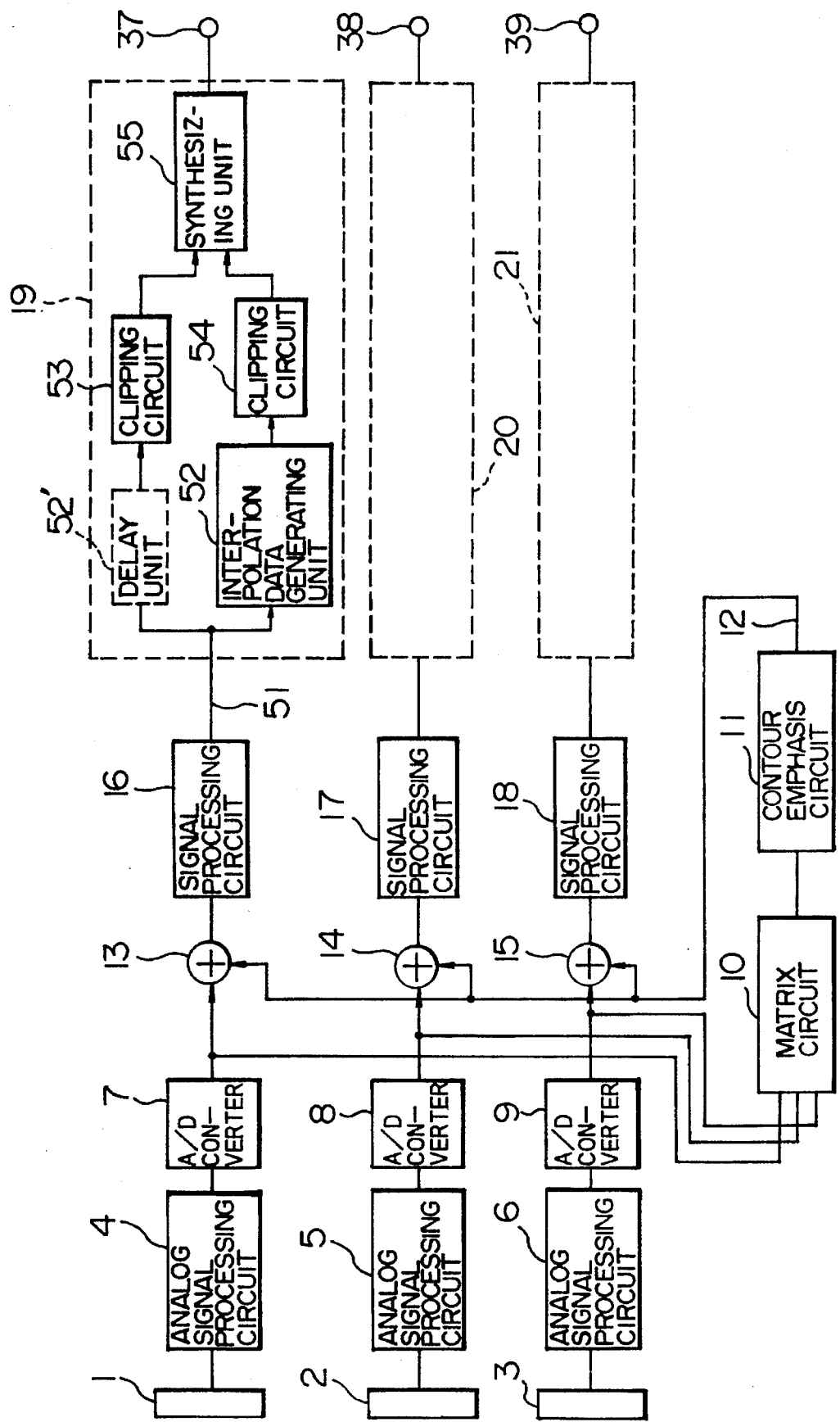
FIG. 7 is a block diagram showing an arrangement of a signal processing unit included in a TV camera according to a first embodiment of the present invention.

At first, the description will be oriented to the operation of a part except an essential part of the present invention, that is signal level restricting circuits 19 to 21 of a TV camera device to which the first embodiment shown in FIG. 7 applies.

R, G and B video signals picked up from image pickup elements 1 to 3 are sent to analog signal processing circuits 4 to 6 in which necessary treatments such as amplification and band restriction are performed with respect to those video signals. The processed signals are converted into digital signals through the effect of analog-to-digital converters 7 to 9. The converted digital R, G and B signals are sent to a matrix circuit 10 in which those signals are mixed at a predetermined ratio. The mixed output of the matrix circuit 10 is applied to a contour emphasis circuit 11 for producing a contour emphasis signal 12. The contour emphasis signal 12 is sent to adding circuits 13 to 15 in which the signal is added to the corresponding one of the R, G and B signals. Then, the R, G and B signals each having the contour emphasis signals added thereto are sent to signal processing circuits 16 to 18 in which some treatments such as gamma correction processing are carried out. Then, the processed signals are sent to signal level restriction circuits 19 to 21.

In turn, the description will be oriented to the operation of signal level restricting circuits 19 to 21 in a signal processing unit of a TV camera, that is, an essential part of the first embodiment of the invention as shown in FIG. 7. An interpolation data generating unit 52 is used to generate an interpolation data signal from the inputted digital video signal 51. The interpolation data generating unit 52 is equivalent to a transversal type filter described about the foregoing interpolating circuits 25 to 27. The interpolation data signal has a signal level predicted at a middle point between the adjacent sampling points of the inputted digital video signal 51.

Further, the digital video signal 51 is applied to a delay unit 52' (indicated by a broken line of FIG. 7) for delaying the signal by the delay of the output of the interpolation data generating unit 52. The delayed signal is sent to clipping circuit 53, and the interpolation data signal is sent to clipping circuit 54. The output of the delay unit 52' and the output of the interpolation data generating unit 52 are clipped to their upper or lower limit values, respectively.

In place of the delay unit 52', a group of partial delay elements contained in a transversal type filter composing the unit 52 may be used for the purpose. An output of the group of delay elements may be applied to the clipping circuit 53.

Then, the clipping operation done by the clipping circuits 53 and 54 gives rise to higher harmonic components and the aliasing distortion based on the higher harmonic components. The phase of the aliasing distortion caused in the clipped interpolation data signal is equivalently and axial-symmetric with respect to the phase of the aliasing distortion caused in the clipped digital video signal in light of the sampling theorem. Hence, a synthesizing unit 55 (to be described below) performs a predictive coding operation with respect to the clipped interpolation data signal and the clipped digital video signal and synthesizes these signals with each other. This makes it possible to offset these aliasing distortion components in reverse phase, thereby removing the distortions.

Next, the concrete arrangement of the synthesizing unit 55 will be described with reference to FIG. 8.

Figure 8:
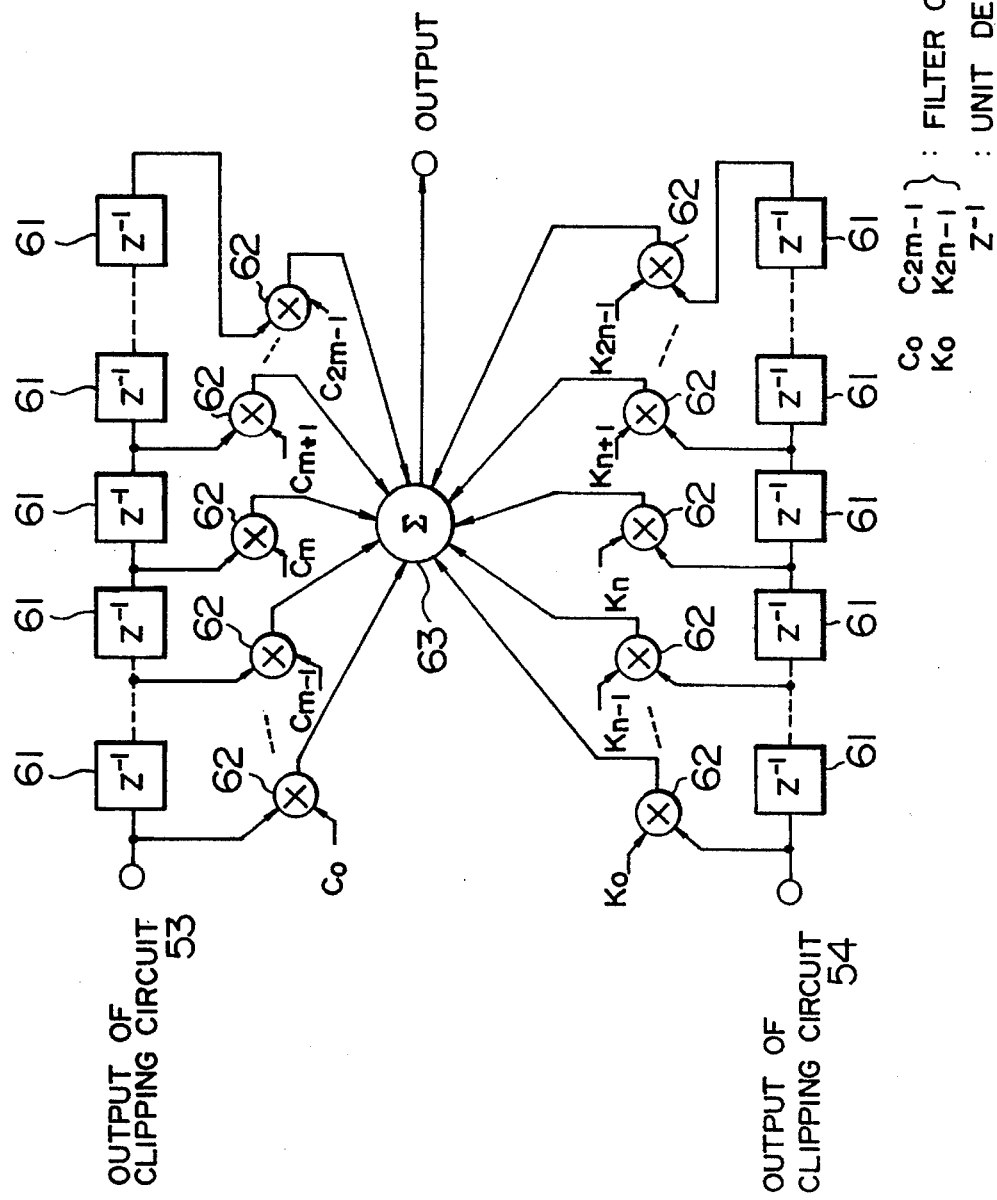
FIG. 8 is a block diagram showing a first concrete arrangement of a synthesizing unit included in the present invention.

In FIG. 8, the output of the clipping circuit 53 is applied to one end of a group of delaying elements 61 serially connected with each other. Each delaying element 61 provides a delayed output at each one clock of a sampling frequency. The output of the clipping circuit 53 is applied to one multiplier 62 and the output of each delaying element 61 is applied to another multiplier 62. In the multipliers, these signals are multiplied by coefficients C0, C1, . . . , C2m-1 in the earlier sequence of the delaying timing. The outputs of these multipliers 62 are applied to an adder 63.

Likewise, the output of the clipping circuit 54 is applied to one end of the other group of delaying elements 61 serially connected with each other. Each delaying element 61 provides a delayed output at each one clock of the sampling frequency. The outputs of the clipping circuit 54 and the delaying elements 61 are applied to their corresponding multipliers 62. In these multipliers, those signals are multiplied by coefficients K0, K1, . . . , K2n-1 in the earlier sequence of the delaying timing. The outputs of those multipliers 62 are applied to the adder 63.

The coefficients may be derived by referring to the constants of the transversal type filters included in the low-pass filters 31 to 33 as described above. For example, in the case of n=2, K0=−1/16, K1=5/16, K2=5/16 and K3=−1/16 may be referred.

The aforementioned synthesizing unit 55 operates to perform a predictive coding operation with respect to each of the clipped interpolation data signal and the clipped digital video signal for matching the phases of these signals and to synthesize them with each other. This operation makes it possible to offset the aliasing distortion components reversely phased with each other, thereby eliminating both of the distortion components.

Hence, the clipping operation gives rise to a digital signal with reducing or preventing occurrence of aliasing distortion, without having to enhance the operating frequency on which the digital signal is processed.

Figure 9:
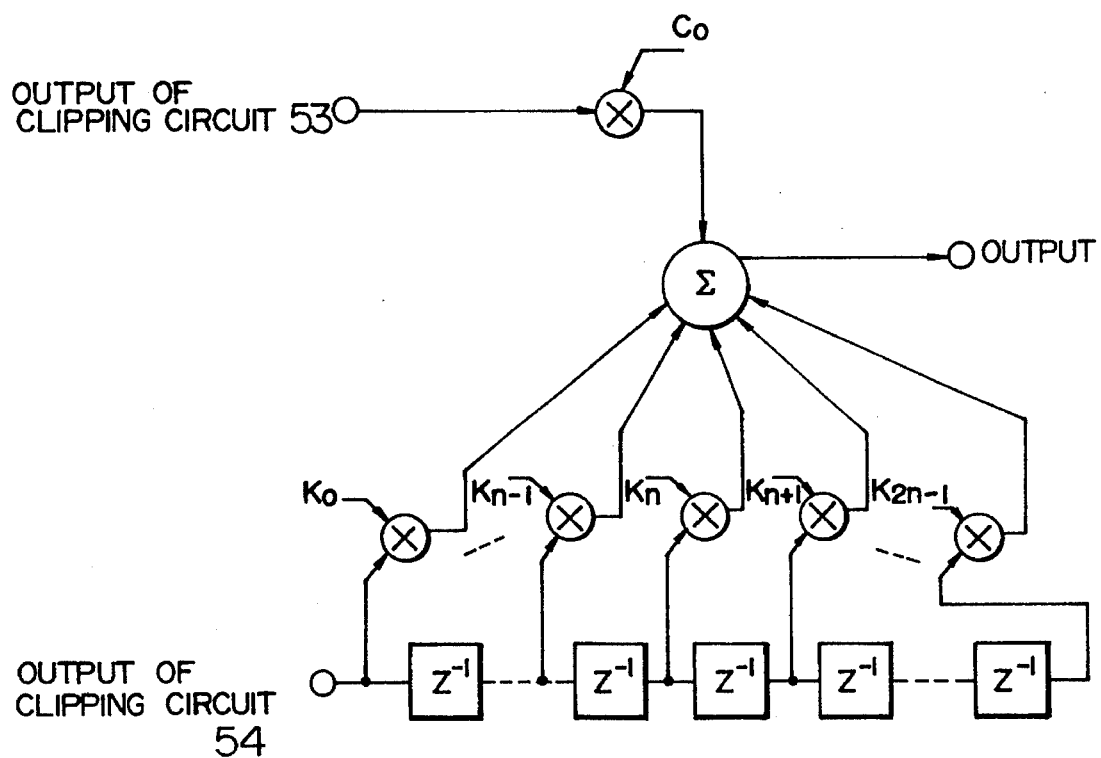
FIG. 9 is a block diagram showing a second concrete arrangement of a synthesizing unit included in the present invention.

Further, a simpler arrangement of the synthesizing unit 55 according to another embodiment will be described with reference to FIG. 9.

This embodiment is arranged on the assumption that the coefficient C0 is ½ and all the coefficients from C1 to C2m-1 except C0 are zero. The arrangement as shown in FIG. 9 does not include the delaying circuits and the multipliers located on the side of the output of the clipping circuit 53 except the multiplier for multiplying the output of the clipping circuit 53 by the coefficient C0, which are all included in the arrangement shown in FIG. 8. This results in greatly reducing the arrangement of the signal level restricting circuit.

In addition, in the case of n=2, the concrete values of coefficients K0, K1, K2 and K3 are K0=−1/16, K1=5/16, K2=5/16 and K3=−1/16.

Figure 10:
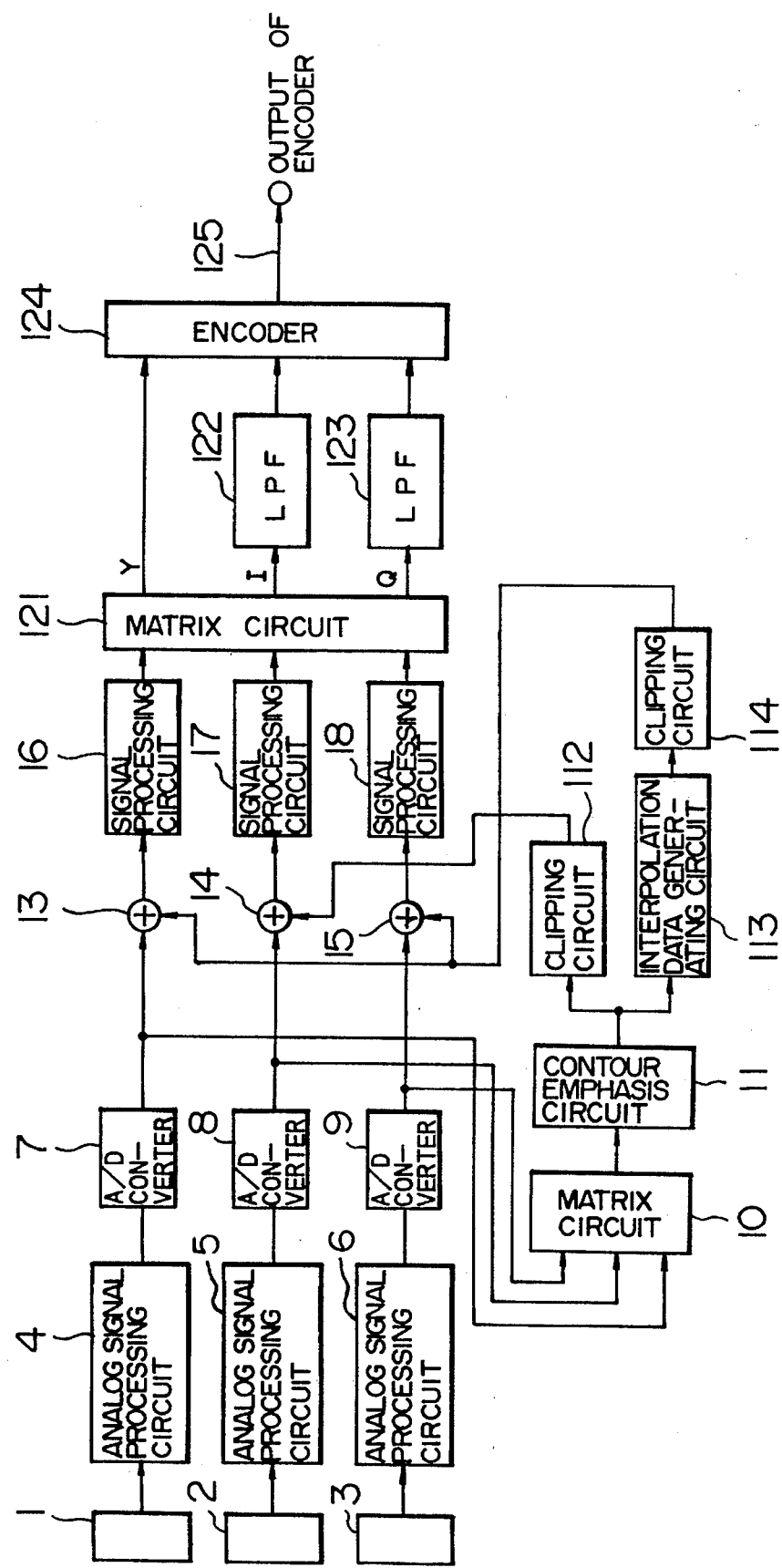
FIG. 10 is a block diagram showing an arrangement of a signal processing unit included in a TV camera according to a second embodiment of the present invention.

In turn, the description will be oriented to another embodiment of the invention in which the invention is applied to a contour emphasis circuit. FIG. 10 shows an overall signal-processing arrangement of a camera system having a contour emphasis circuit to which the invention is applied. Later, the operation of this embodiment will be discussed in detail.

Figure 4:
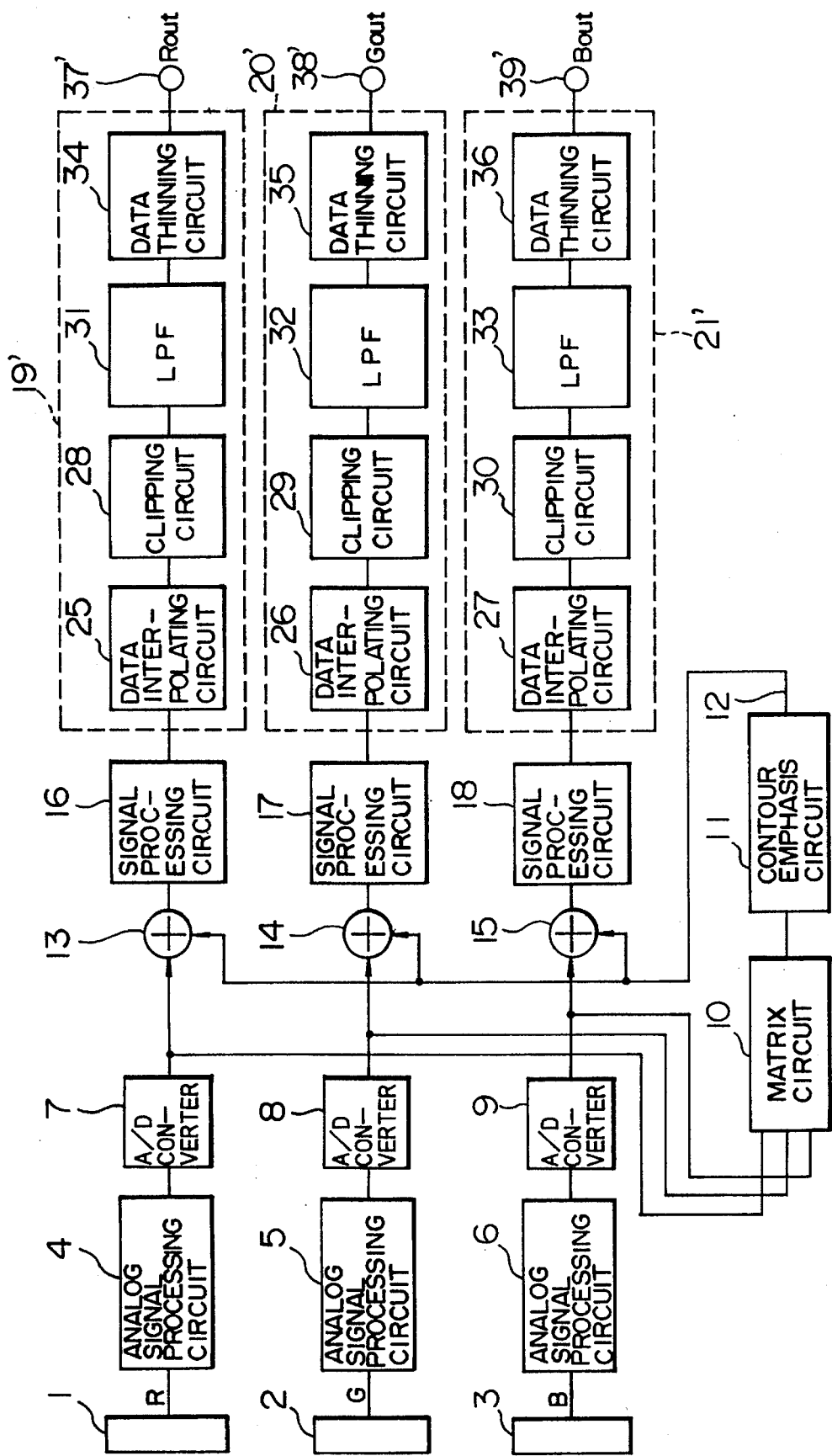
FIG. 4 is a block diagram showing an arrangement of a signal processing unit of a conventional TV camera.
Figure 5:
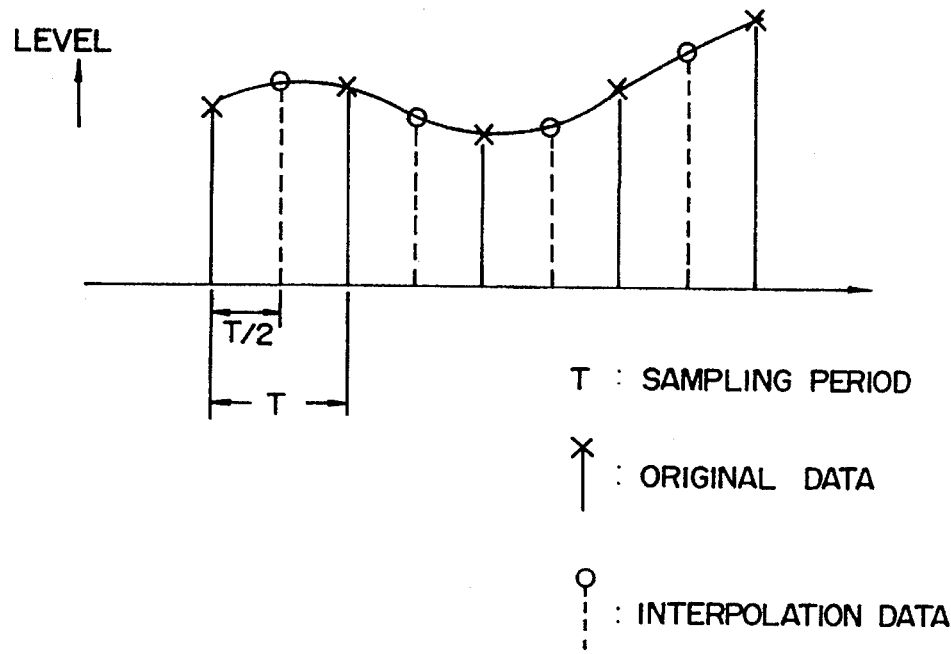
FIG. 5 is a graph showing a relation between an original video signal and interpolation data signal.
Figure 6:
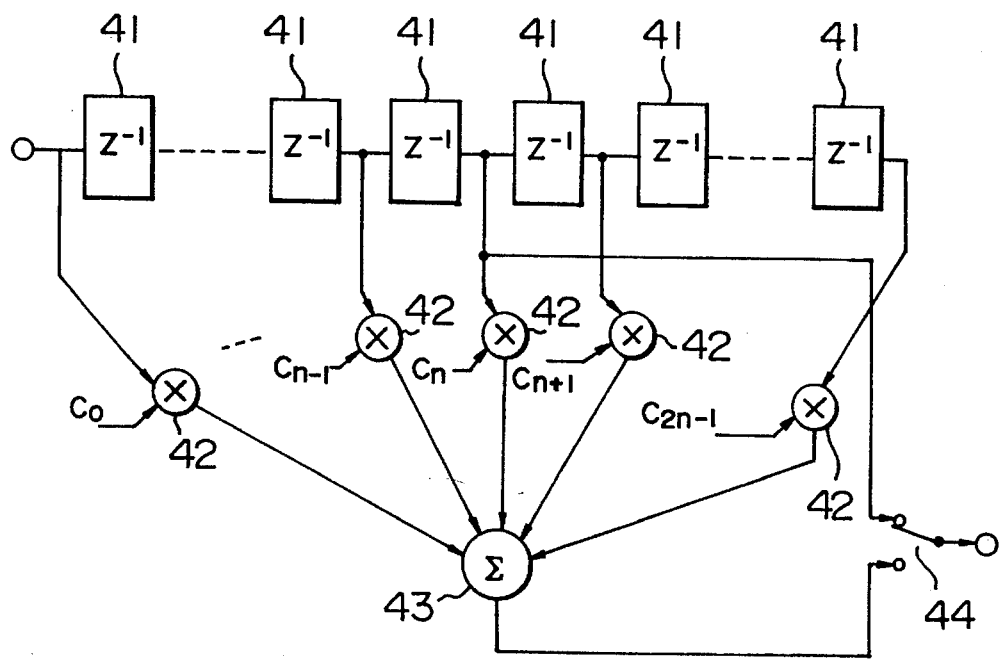
FIG. 6 is a block diagram showing a definite degree digital filter forming an data interpolating circuit shown in FIG. 4.

The output of the contour emphasis circuit 11 is applied to the clipping circuit 112 and the interpolation data generating circuit 113. In the interpolation data generating circuit 113, as shown in FIG. 5 which describes the relation between the video signal and the interpolation data signal, the interpolation data signal indicated by a circle mark of FIG. 5 is generated at the middle point of the sampling period T by performing an interpolating operation with respect to the contour emphasis signal indicated by an X mark of FIG. 5 (that is, original data) of the period T. The middle point is one example. Another intermediate position may be selected. The interpolation data value can be ideally obtained by calculating an output which is given when a delta function series signal is passed through a low-pass filter having an ideal Nyquist frequency. The delta function series signal corresponds to a discrete sampled signal.

Figure 11:
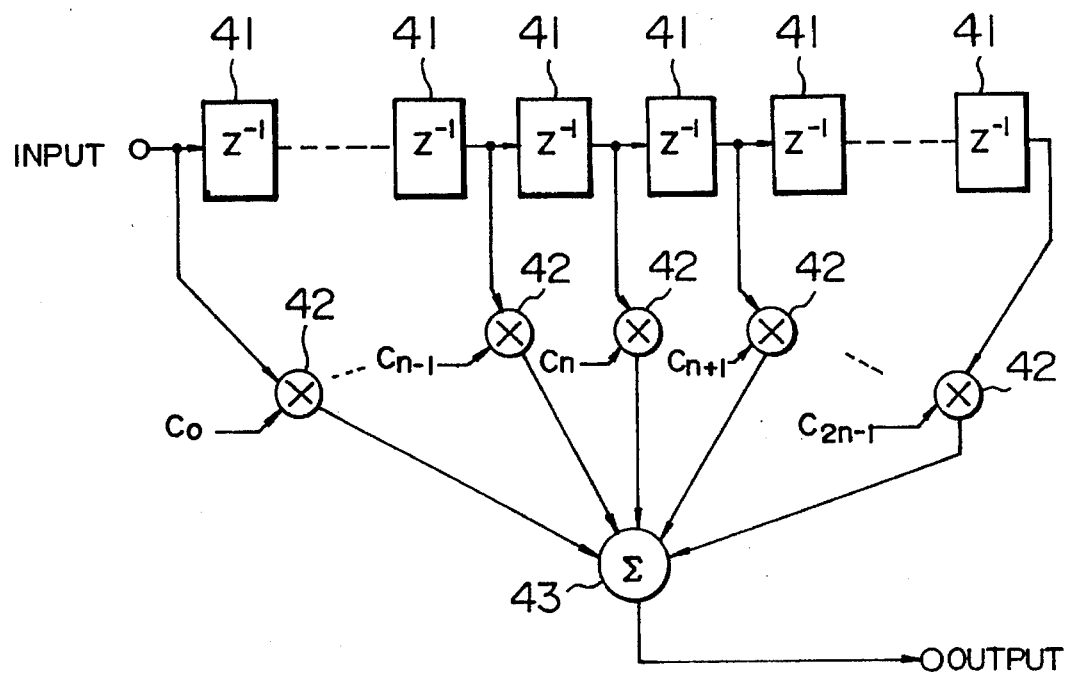
FIG. 11 is a block diagram showing a concrete arrangement of an interpolation data generating circuit having a digital filter included in the embodiment shown in FIG. 10.

To realize this, however, an infinite amount of data is required for the calculation. Normally, hence, as a simple arrangement, a definite degree digital filter composed of the delaying elements 41, the multipliers 42, and the adder 43 is used for the purpose. This is indicated in FIG. 11 which shows the arrangement of the digital filter. Each of the filter coefficients C0 to C2n-1 to be added to the multiplier 42 may be a designed value of the transversal type digital filter having a half of the sampling frequency fc as a cut-off frequency. As a simple example, in the case of n=2, the coefficients are derived as follows: C1, C2=0.625 and C0, C3=−0.125.

Figure 12:
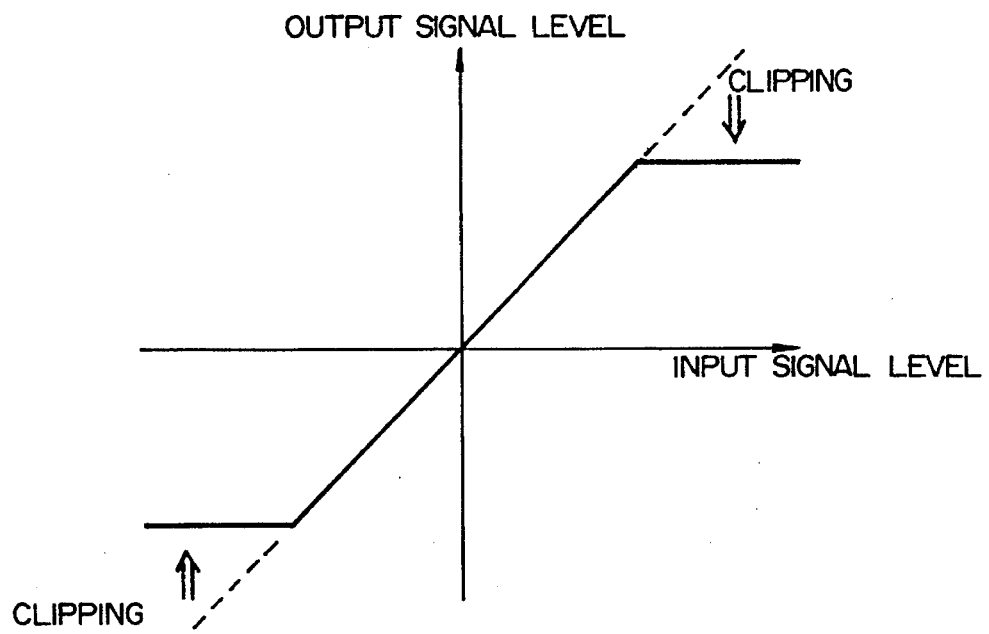
FIG. 12 is a graph showing an I/O characteristic of a clipping circuit included in the embodiment of FIG. 10.

Further, the original contour emphasis signal is applied to a first clipping circuit 112 and the interpolation data signal obtained by the foregoing process is applied to a second clipping circuit 114. These signals are clipped in the predetermined range of a signal level. This is based on the characteristic as shown in FIG. 12, for example. As described above, the clipping operation inevitably gives rise to higher harmonic components having a higher frequency than a half of the sampling frequency fc, which higher harmonic components bring about the aliasing distortion.

As mentioned above, however, the sampling phase of the original contour signal is axial-symmetric with respect to that of the interpolation data signal. Hence, the aliasing distortion of the first higher harmonic components existing in the signal issued from the clipping circuit 112 is 180°-reversed in phase with respect to that existing in the signal issued from the clipping circuit 114 but has the substantially same level. That is, both of the signals have the opposite polarities to each other but the same absolute value as each other.

As a result, by executing the signal processing to be described below, an aliasing distortion of the first harmonic components is offset with the other aliasing distortion. In addition, the aliasing distortion of the second or later higher harmonic components has the small level whatever sign it may have. Hence, the second or later higher harmonic components do not have an adverse effect on the resulting image quality.

At first, the output signal from the first clipping circuit 112 is added to the G signal in the adding circuit 14. The signal addition gives the contour emphasis capacity to the G signal. The output signal from the second clipping circuit 114 is added to the R signal in the adding circuit 13. Likewise, the same output signal is added to the B signal in the adding circuit 15. These adding operations give the contour emphasis capacities to the R and the B signals. These G, R and B signals are sent to the signal processing circuits 16 to 18, respectively, in which some treatments such as gamma correction process are performed with respect to those signals. The processed G, R and B signals are all applied from the corresponding signal processing circuits 16 to 18 to a matrix circuit 121. The matrix circuit 121 operates to mix the processed R, G and B signals with each other at a predetermined ratio for synthesizing a luminance signal Y and color difference signals I and Q. The luminance signal Y synthesized in the matrix circuit 121 is applied to an encoder 124. The color difference signal I is applied to a low-pass filter 122 and the signal Q is applied to a low-pass filter 123 for restricting the bands of the color difference signals I and Q. Then, the band-restricted signals I and Q are applied to the encoder 124. The encoder 124 operates to modify the band-restricted color difference signals I and Q with a sub-carrier, overlap the modified signals with the luminance signal Y and output a composite color signal to the later stage (not shown).

As mentioned above, the aliasing distortion contained in the contour emphasis signal added to the G signal, which occupies about a half of the luminance signal components, is 180°-reversed in phase to the aliasing distortion contained in the contour emphasis signal added to the remaining R and B signals. Synthesis of these signals results in substantially offsetting the aliasing distortions with each other. Hence, the luminance signal to be outputted to the later stage hardly has aliasing distortion, so that no image degrade caused by the aliasing distortion takes place.

In actual, as described above, the luminance signal is synthesized at a ratio of R:G:B=30:59:11. As a result, it is presumed that about 18% of the original aliasing distortion components is left, which does not have a significant effect on image quality.

The matrix circuit operates to synthesize the color difference signals I and Q at a different ratio with the ratio of the luminance signal Y, at which the aliasing distortions are not so much offset. The aliasing distortions caused by the color difference signals do not have so much more adverse effect on the image quality than that caused by the luminance signal. These thus have a negligible effect on image quality respectively.

A TV camera system is normally arranged to add the contour emphasis signal to the video signal and then restrict the video signal level through the effect of a white and black clipping circuit or the like. This normal kind of TV camera system may have the above-mentioned arrangement. That is, since the phases of the aliasing distortions are reversed to each other, when producing the luminance signal with respect to clipped video signal, the aliasing distortion components of the G and R, B signals are substantially offset with each other.

As described above, the present invention offers a digital video signal processing device which enables to restrict the signal output level by the digitally clipping operation with hardly the aliasing distortion.

In order to reduce the aliasing distortion caused by clipping the contour emphasis signal, the aliasing distortion components are substantially cancelled without having to filter the luminance signal. The cancellation leads to improving the image quality.

What is claimed is:

1. A TV camera device comprising:

digital contour emphasis means for generating a digital contour emphasis signal from digitized video signals;

first clipping means for clipping said digital contour emphasis signal to a predetermined upper limit value or lower limit value and providing an output thereof;

interpolation data generating means for generating interpolation data at an intermediate point between adjacent sampling points from said digital contour emphasis signal;

second clipping means for clipping said interpolation data to said predetermined upper limit value or lower limit value and providing an output thereof;

first adding means for adding one of the outputs from said first and second clipping means to a G signal of said digitized video signals; and second adding means for adding the other of the outputs from said first and second clipping means to R and B signals of said digitized video signals.

2. A TV camera device according to claim 1, further comprising image pickup means for providing video signals, analog signal processing means for processing the video signals, A/D converter means for converting the processed video signals from the analog signal processing means into said digitized video signals, said digital contour emphasis means being coupled to said A/D converter means, said first clipping means being coupled to said digital contour emphasis means, said interpolation data generating means being coupled to said digital contour emphasis means, said second clipping means being coupled to said interpolation data generating means, said first adding means adding the one of the outputs from said first and second clipping means to said G signal of said digitized video signals from said A/D converter means, and said second adding means adding the other of the outputs from said first and second clipping means to said R and B signals of said digitized video signals from said A/D converter means.

3. A TV camera device according to claim 2, further comprising:

signal processing means coupled to said A/D converter means through said first and second adding means for processing said digitized video signals from said first and second adding means; and matrix means coupled with said signal processing means for mixing said digitized video signals from said signal processing means together.

4. A TV camera device according to claim 2, wherein said digital contour emphasis signal is generated from said R, G and B signals of said digitized video signals outputted from said A/D converter means.

5. A TV camera device according to claim 2, wherein the output from said first clipping means is added to said G signal of said digitized video signals from said A/D converter means, and the output from said second clipping means is added to said R and B signals of said digitized video signals from said A/D converter means.

6. A digital video signal processing device for clipping a digital contour emphasis signal generated from inputted digitized video signals so that said digitized video signals are kept within a predetermined level, said digital video signal processing device comprising:

digital contour emphasis means for receiving said digitized video signals and for generating a digital contour emphasis signal;

first clipping means coupled with said digital contour emphasis means for clipping said digital contour emphasis signal and providing an output thereof;

interpolation data generating means coupled with said digital contour emphasis means for generating interpolation data at an intermediate point between adjacent sampling points from said digital contour emphasis signal;

second clipping means coupled with said interpolation data generating means for clipping said interpolation data and providing an output thereof;

first adding means coupled with one of said first and second clipping means for adding one of said outputs from said first and second clipping means to a G signal of said inputted digitized video signals;

second adding means coupled with another one of said first and second clipping means for adding another one of said outputs from said first and second clipping means to R and B signals of said inputted digitized video signals; and matrix means coupled with said first and second adding means for mixing the outputs from said first and second adding means together.

7. A digital video signal processing device according to claim 6, wherein said digital contour emphasis signal is generated from said R, G and B signals of said inputted digitized video signals, said output from said first clipping means is added to said G signal of said inputted digitized video signals, said output from said second clipping means is added to said R and B signals of said inputted digitized video signals, said R, G and B signals of said digitized video signals from said first and second adding means are processed in a signal processing means, and said R, G and B signals of said digitized video signals from said signal processing means are mixed with each other in said matrix means for synthesizing a luminance signal and color difference signals.

\* \* \* \* \*